Figure 1:
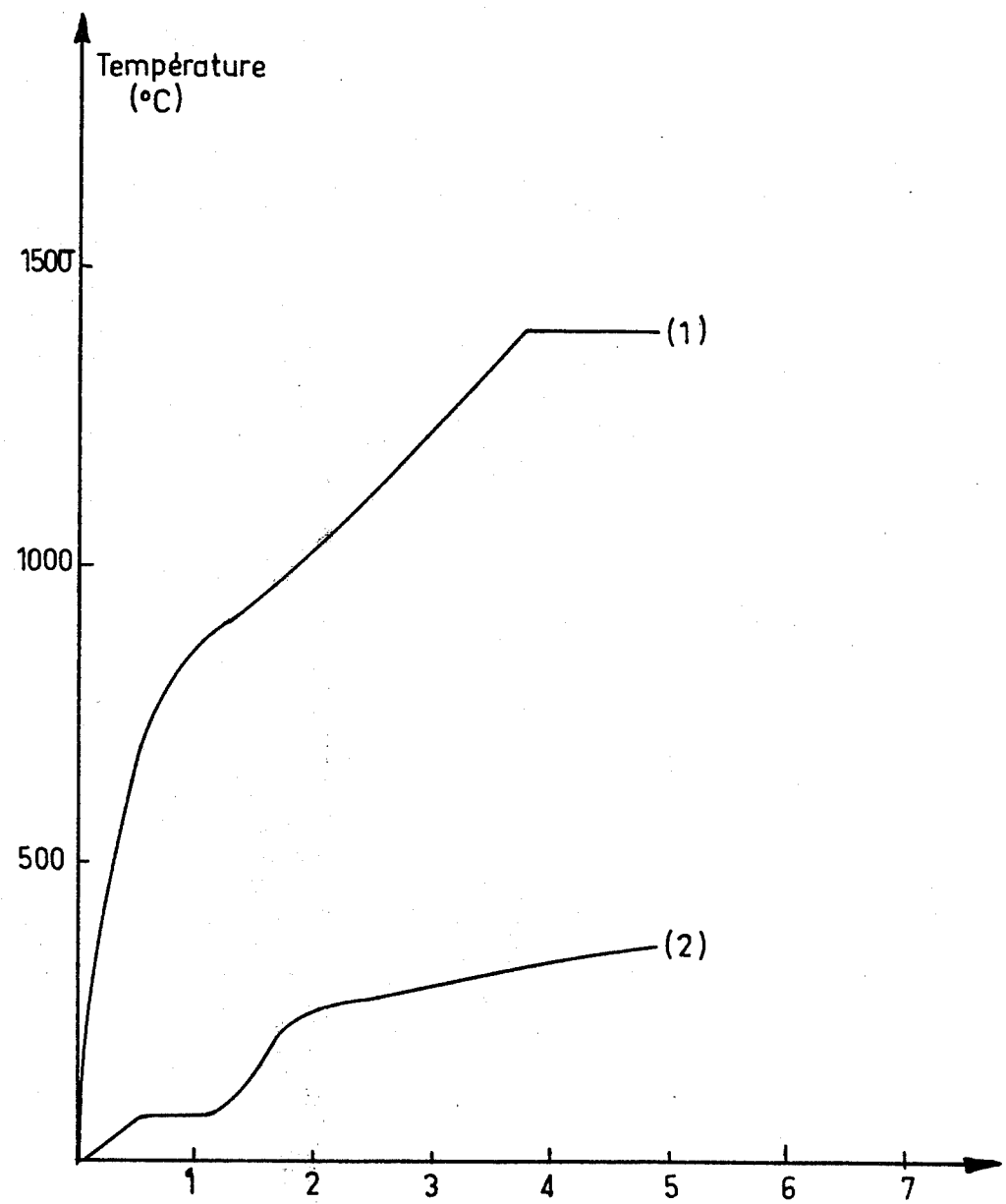

United States Patent [19]

Mathieu

[11] 4,261,757

[45] Apr. 14, 1981

[54] REFRACTORY PLASTER

[75] Inventor: Alain Mathieu, Montelimar, France

[73] Assignee: Lafarge, Paris, France

[21] Appl. No.: 69,316

[22] Filed: Aug. 24, 1979

[30] Foreign Application Priority Data

Sep. 5, 1978 [FR] France ................................ 78 25508

[51] Int. Cl.³ ............................................ C04B 11/00
[52] U.S. Cl. .................................................... 106/110
[58] Field of Search ................................ 106/110, 111

[56] References Cited

U.S. PATENT DOCUMENTS

| | | | |
|---|---|---|---|
| 2,899,326 | 8/1959 | Butler | 106/110 |
| 3,069,278 | 12/1962 | Kimpel | 106/110 |
| 3,303,030 | 2/1967 | Preston | 106/110 |
| 4,053,322 | 10/1977 | Holbek | 106/110 |
| 4,146,402 | 3/1979 | Kira et al. | 106/110 |

*Primary Examiner*—James Poer
*Attorney, Agent, or Firm*—Burgess, Ryan and Wayne

[57] ABSTRACT

A refractory plaster containing semi-hydrated calcium sulphate, mineral fibres and a mineral filler material. This plaster has outstanding fire-retardant properties at temperatures of up to 1400° C. and can be used as a refractory material, while being adapted to be used in a manner similar to that of a conventional plaster.

10 Claims, 2 Drawing Figures

REFRACTORY PLASTER

BACKGROUND OF THE INVENTION

The present invention is related to a plaster resistant to high temperatures in the order of 1350° to 1400° C; in other words, the invention is concerned with a refractory plaster material.

The conventional plasters constitute excellent insulating materials, but they are not adapted to be used at elevated temperatures. The $CaSO_4, \frac{1}{2}H_2O$ semi-hydrate, when hydrated to form plaster, will show cracks when exposed to temperatures of 200° C. This deterioration will be accentuated, and the network formed by the cracks become most important, when the temperature reaches a value of approximately 900° C, the material then losing all of its cohesion. At temperatures of about 1200° C, $SO_2$ will volatilize and the plaster will be structurally impaired by inflation or swelling due to rehydration when the lime formed cools.

So-called "fire-retardant plasters" are known which, by dehydratation of the gypsum ($CaSO_4, 2H_2O$) and by their insulating power due to the presence of a lightweight additive (such as vermiculite, for example) exhibit effective fire-retardant properties. However they undergo rapid destruction when the temperature reaches values over 1000° C.

It is an object of the present invention to provide a material containing plaster, overcomes the above-described drawbacks of the known materials and which exhibit satisfactory properties at temperature of up to 1350°-1400° C.

The material according to the invention retains its dimensional stability and is not altered when subjected to high temperatures, even when the latter reach 1400° C. The novel material further exhibits excellent thermal shock-resisting properties under conditions of sudden temperature rise, and is explosion proof.

The thermically isolating and fire-retarding properties of a plaster according to the present invention are such that the latter is particularly well adapted to be used in the building industry. It may be used for the protection of walls and/or metallic beams, for the manufacture of structural squares or panels, etc.

The material according to the present invention comprises $CaSO_4 \frac{1}{2} H_2O$, alumious filler and mineral fibres. Said material is a filler-containing plaster and it can be used in a manner similar to that applied to the known plasters, as far as moulding and the projecting techniques are concerned. The presence of the aluminous filler leads to the formation of stable $C_4A_3\bar{S}$ at temperatures up to 1400° C. When an excess amount of alumina is present and when the temperature rises to values of above 1400° C, formation of $CA_2$ and $CA_6$, which are restistant against humidity, is observed after evaporation or volatilization of $SO_3$.

In the present description, $C_3A_4S$ designates anhydrous calcium sulphoaluminate ($4CaO, 3Al_2O_3SO_3$), while $CA_2$ and $CA_6$ designate, respectively, calcium dialuminate ($CaO, 2Al_2O_3$) and calcium hexa-aluminate ($CaO, 6Al_2O_3$).

The proportion of calcium sulfate with respect to the amount of filler material is defined by the ratio "$Al_2O_3/CaO$" which may vary from 1.20 to 12.

On the other hand, the fibres serve to reinforce the structure of the material and to avoid cracking; the proportion of fibres used can vary between 2 and 15%.

The aluminous filler material may be alumina or bauxite, or a mixture thereof. Preferably the ratio of $Al_2O_3/CaO$ contained in the novel plaster is between 1.2 and 12 (by weight), and more preferably between about 2.5 and 5.

The calcium sulphate utilized in accordance with the present invention is preferably a calcium sulphate of a fine granulometric grade such that on sieving, using 100 micron meshes, the reject does not exceed a proportion of 25%; for example, a semi-hydrated C calcium sulphate or a B calcium sulphate may be used, i.e. a product the granulometric characteristics of which as determined by a method using a laser, correspond to those indicated in Table A herein below:

TABLE A

| | Laser granulometry | | | | | | Passing through 100μ mesh sieve |
|---|---|---|---|---|---|---|---|
| | 2μ | 4μ | 8μ | 16μ | 32μ | 64μ | |
| C | 6 | 14 | 24 | 36 | 53 | 77 | 97 |
| B | 9 | 20 | 32 | 45 | 59 | 80 | 98 |

Said calcium sulphate may also still subsist in the form of phosphogypsum, i.e. in the form of a plaster obtained from phosphogypsum, which is a by-product well-known in the phosphoric acid-producing industry.

The aluminous filler according to the invention can be constituted by any aluminous material having, after calcination of the material considered, an alumina content of more than 80% and preferably at least 85%, this alumina component being more particularly alumina A and/or white bauxite re-crushed to 6000 cm²/g Blaine Specific Surface, the reject, when sieving through a 100 micron mesh sieve being less than 10%.

The fibres used in a proportion comprised between 2 and 25% and preferably 2 and 15% by weight of the mixture, and most preferably used in a proportion comprised between 4 and 6% are silicon-containing mineral fibres, silicon-and aluminum containing fibres which are currently used in the technical fields of building and refractory materials. Said fibres may also be constituted by silicon and calcium containing fibres.

Examples of convenient fibres are the fibres marketed under the commerical designations FIBRAL [by the firm named Société d'Etude de Produits Réfractaires (SEPR)], SAFFIL (ICI), KERLANE (SEPR), SEMFIL (of FIBER GLASS), STRATIFIL (of Saint-Gobain), Preferably a plaster according to the present invention is prepared by incorporating the various constituents of which it is composed:

-directly in the form of flakes, during mixing the plaster,

-or after de-carding or unballasting of the dry mixture.

The invention will be described in a more detailed manner herein-below with reference to the following Examples which are given by way of illustration, but not of limitation.

EXAMPLE 1

A plaster according to the invention was prepared, said plaster containing:

—40,27% B calcium sulphate,
—54,97% re-crushed A alumina having a specific Blaine surface of 6000 cm³/g, —4,76% randomly distributed mineral Kerlane fibres (commercial designation), having the following chemical composition (by weight):

| | | |
|---|---|---|
| $SiO_2$ | 2.89 | |
| $Al_2O_3$ | 57.04 | |
| CaO | 16.74 | |
| $SO_3$ | 22.83 | thus a ratio of |
| $TiO_2$ | 0.20 | $Al_2O_3/CaO = 3,40$ |
| $Fe_2O_3$ | 0.10 | |
| Alkaline substance | 0.20 | |
| | 100% | |

It is observed that this plaster, after mixing in a conventional apparatus, with an addition of 37% of water (W/P=0.37) and 0.1% of a conventional plaster fluidizing agent, such as a proteinic hydrolysate, for example the hydrolysate marketed under the commerical designation of "RETARDAN" gives raise to the properties indicated in Table I herein-after. →

Generally speaking, it is seen that the mechanical performances do not vary with the temperature. This material is an isolating material (porosity =50%). Furthermore its thermal conductibility is about 0.25° and 0.30 $kcal.m^{-1}.h^{-1}.°C.^{-1}$ whereby this material becomes part of the class of the known isolating concretes and is slightly superior to the so-called fire-retardant plasters.

Collapsing tests under a load of 0.5 bar showed collapsing value of 4 to 5% at a temperature of about 1400° C., while the same tests effected with the above-mentioned plaster B alone showed collapse at 950° C.

Panels having the dimensions of 54×27×4 cm exhibited no sign of deterioration after the heat resistance tests. These tests consisted essentially in placing the tested panel in front of the opening of a gas oven.

TABLE I

| | 4h* | | 24h* | | 110° C. | | 600° C. | | 1000° C. | | 1200° C. | | 1400° C. | |
|---|---|---|---|---|---|---|---|---|---|---|---|---|---|---|
| | F | C | F | C | F | C | F | C | F | C | F | C | F | C |
| Mechanical strength | 27 | 30 | 29 | 35 | 27 | 28 | 22 | 25 | 13 | 20 | 13 | 20 | 18 | 30 |
| Density | 1.39 | | | | | | 1.45 | | 1.29 | | 1.28 | | 1.11 | |
| Dimensional variation after setting, % | | | | | | | −0.65 | | −0.90 | | −0.65 | | +1.25 | |
| Porosity, % | 57.05 | | | | | | 55.05 | | 58.50 | | 67 | | 66.88 | |

*determined after drying at 40–50° C.

The appended FIG. 1 shows the compared evolution of the respective temperatures on the face exposed to flame and on the opposite face of the panel.

From this Figure, it is obvious that:

—the non-exposed face of the tested panel reached a temperature of 140° C. after 90 minutes, when the panel had a thickness of 4 cm;

—no deterioration of the panels was observed even when the surface exposed to heat reached 1400° C;

—when a temperature of 1400° C. was attained on the heat-exposed surface during 30 minutes, the non-exposed surface had a temperature of 350° C;

—when maintaining a temperature level of 1400° C. during 30 minutes, a temperature of 350° C. was obtained on the non-exposed surface of the panels made in accordance with the present invention.

Fire-retardance tests effected with a composition comprising no fibres have lead to the formaton of cracks due to differential dilatation. Such test results thus justify the use of the fibres.

EXAMPLE 2 to 6

According to the process described in Example 1, mixtures including the composition indicated in Table II herein-after were prepared.

The fibres of Examples 2 to 6 were silico-aluminous fibres marketed under the commerical designation of "Kerlane".

The mixtures of Examples 2 to 6 had the following chemical composition, respectively (cf. Table III hereinafter).

TABLE II

| | EXAMPLE | | | | |
|---|---|---|---|---|---|
| Composition of the mixture | 2 | 3 | 4 | 5 | 6 |
| Calcium sulphate | 41.46 | 35.96 | 41.46 | 40.22 | 35.96 |
| Alumina (6000 cm²/g SSB) | 56.54 | 49.04 | 0 | 0 | 0 |
| White bauxite (6000 cm²/g SSB) | 0 | 0 | 56.54 | 54.87 | 49.04 |
| Fibres | 2 | 15 | 2 | 4.91 | 15 |

TABLE III

| | $SiO_2$ | $Al_2O_3$ | CaO | $SO_3$ | $TiO_2$ | $Fe_2O_3$ |
|---|---|---|---|---|---|---|
| Example 2 | 1.51 | 57.68 | 17.25 | 23.56 | — | — |
| Example 3 | 8.03 | 56.45 | 14.96 | 20.56 | — | — |
| Example 4 | 4.99 | 51.22 | 17.25 | 23.56 | 2.23 | 0.75 |
| Example 5 | 6.41 | 51.20 | 16.73 | 22.83 | 2.16 | 0.67 |
| Example 6 | 11.05 | 50.85 | 14.96 | 20.56 | 1.93 | 0.65 |

These plasters when tested, according to Example 1, exhibited properties which are substantially similar to those indicated in Example 1.

In Examples 2 to 6, the $Al_2O_3/CaO$ ratio of the tested mixtures was between 3 and 4.

EXAMPLES 7 to 9

The instant process was performed in accordance with the method described in Example 1, using mixtures having the composition indicated in Table IV hereinbelow, the A/C ratios being about 2 and 12.

TABLE IV

| | Composition | | | | | | | |
|---|---|---|---|---|---|---|---|---|
| No. | P | A | F | SiO | $Al_2O_3$ | CaO | $SO_3$ | A/C |
| 7 | 53.92 | 41.18 | 4.90 | 3.14 | 44.07 | 22.44 | 30.35 | 1.96 |
| 8 | 17.12 | 77.98 | 4.90 | 2.70 | 79.93 | 7.12 | 10.25 | 11.23 |
| 9 | 62.24 | 32.86 | 4.90 | 3.21 | 35.67 | 25.72 | 35.40 | 1.38 |

P: Above-mentioned plaster B
A: Alpha-alumina recrushed to 6000 cm²/g
F: Kerlane ® type silico-aluminous fibres.

The samples obtained in accordance with Examples 7 to 9 exhibited properties similar to those of the materials obtained in accordance with Examples 1 to 6.

EXAMPLE 10

The process described in Example 1 was applied, however the Kerlane fibres (commercial designation)

were replaced by silicon-calcium containing fibres currently used in the building industry.

A material was obtained which, at a temperature of 1100° C., exhibited a definite improvement, as far as its fire-retardent properties were concerned, as compared to the properties of conventional plasters. However this material did not allow temperatures on the order of 1400° C. to be reached, contrary to the preceeding Examples wherein the fibres described above were used.

EXAMPLE 11

As described in Example 1, a plaster according on the invention was prepared from a mixture having the following composition:
- —40.27% calcium sulphate B as mentioned above,
- —54.97% recrushed A alumina particle size: 6000 cm²/g (Specific Blaine Surface),
- —4.76% mineral aluminous fibres of the commerical designation Fibral, having the following composition:
$SiO_2$: 1.20   $Al_2O_3$: 59.19   CaO: 16.76   $SO_3$: 22.65 alkaline substances: 0.2

These aluminous fibres give rise to results, as far as the plaster thus obtained is concerned, which were similar to those obtained in accordance with Example 1; however as their cost was far more elevated than that of the KERLANE silico-aluminous fibres used in Example 1, this resulted in a considerable raise in the manufacturing cost of the final material.

EXAMPLE 12

A foamed plaster was prepared from the composition obtained in accordance with Example 1, to wit:
- —40.27% semi-hydrated type C calcium sulphate of the above-mentioned blend; —54.97% alumina recrushed to 6000 cm²/g (Blaine),
- —4.76% KERLANE fibres, after addition of a foam constituted by:
- —800 cm³ water,
- —20 cm³ Millifoam (commercial designation) formed to a height of 20 cm, the "water/plaster" ratio (W/P) being 0.55

This foamed plaster resisted to temperatures of up to 1400° C. and exhibited refractory properties equivalent to those of the commercially available plasters. The thermal conductibility coefficient (Kcal.m$^{-1}$.h$^{-1}$.°C.$^{-1}$) was equal to about 0.15–0.2.

TABLE V

| Example 11 | 24h | 600° C. | 1000° C. | 1400° C. |
|---|---|---|---|---|
| Density | 0.989 | 0.880 | 0.928 | 0.657 |
| Porosity, % | 64.40 | 71.10 | 71.20 | 79.70 |
| Dimensional variation after setting, % | — | −0.81 | −1.34 | −0.4 |

Figure 2:
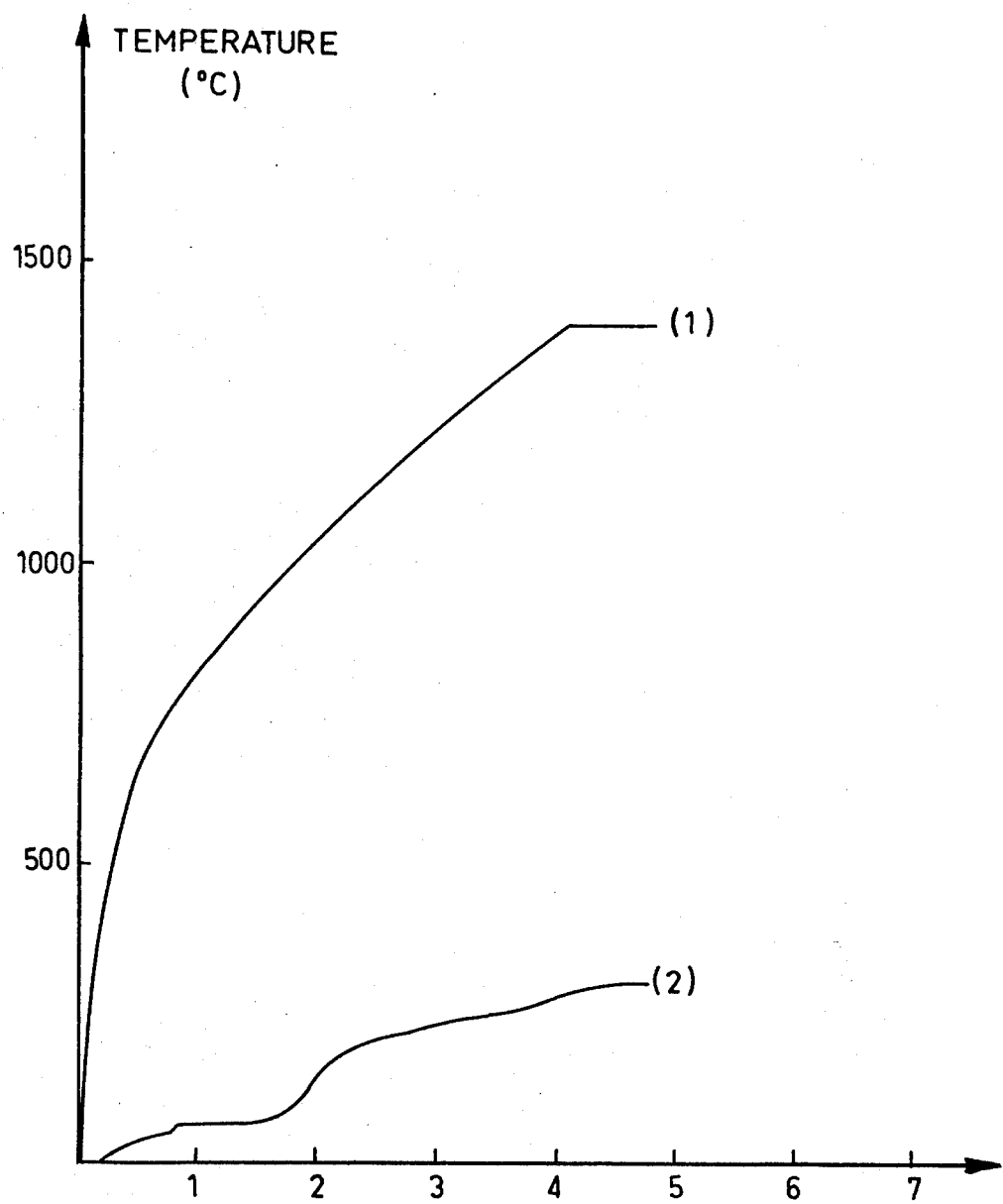

Said foamed plaster had excellent isolating properties as shown by the fire-retarding test (FIG. 2).

Of course the invention is not limited to the embodiments shown and described herein-above; numerous variations may be envisaged by those skilled in the art within the scope of the invention as defined in the claims attached hereto.

Thus, for example, the novel plaster can be used in the same manner and fields as the conventional plasters; in fact, this novel plaster imparts to the materials, as obtained after mixing, fire-retarding (or refractory) properties similar to those of the starting ternary composition.

FIGS. 1 and 2 are diagrams showing, on the abscissa, the time (in hours), and on the ordinate, the temperature of the faces of plaster panels having a thickness of 4 cm.

Curve 1 represents the evolution of temperature on the face exposed to the flame, in function of time, while curve 2 represents the evolution of temperature of the opposite face (which is not exposed to the flame) in function of time.

FIG. 1 relates to plaster panels according to Example 1, and FIG. 2 relates to plaster panels according to Example 12.

The inventor has carried out an analysis of the utilized fibres; the results recorded in Table VI have been obtained.

TABLE VI

|  | $SiO_2$ | $Al_2O_3$ | CaO | $Fe_2O_3$ | Alkali | MgO | $ZrO_2$ |
|---|---|---|---|---|---|---|---|
| KERLANE | 50.60 | 48.50 | 0.20 | 0.30 |  |  |  |
| FIBRAL | 14.80 | 85.10 | — | 0.10 |  |  |  |
| SEMFIL | 60.80 | 4.60 | 3.60 | — | 14.20 |  | 16.8 |
| SILICO-CALCIC | 42.70 | 11.40 | 38.80 | 1.50 | 0.60 | 5.0 |  |

What is claimed is:

1. A refractory plaster which contains semi-hydrated calcium sulfate, mineral fibers and an aluminous filler material containing at least 85% by weight $Al_2O_3$, the proportion of calcium sulfate with respect to the amount of filler material being defined by the ratio $Al_2O_3$/CaO of 1.2 and 12 by weight and the particle size of said filler material being such that not more than 10% by weight will be retained on a 100$\mu$ sieve.

2. A plaster according to claim 1, wherein the $Al_2O_3$/CaO ratio is between 2.5 and 5.

3. A plaster according to any one of claims 1 or 4, wherein the amount of fibres is comprised between 2 and 25% and preferably between 4 and 6%.

4. The plaster according to claim 3, which contains semi-hydrated calcium sulphate, mineral fibres and an aluminous filler material, the amount of mineral fibres being between 2 and 15%.

5. The plaster according to claim 1, 6, wherein said fibres are siliceous fibres, said plaster having satisfactory fire-retardant proporties at temperatures of up to 1400° C.

6. The plaster of claim 3, wherein said mineral fibres are silico-aluminous fibres, said plaster having satisfactory fire-retardant properties at temperatures of up to 1400° C.

7. The plaster according to claim 3, wherein said mineral fibres are aluminous fibres, said plaster having satisfactory fire-retardant properties at temperatures of up to 1400° C.

8. The plaster according to claim 3, wherein said fibres are silicium and calcium-containing fibres, said plaster having satisfactory fire-retardant properties at temperatures of up to 1100° C.

9. The plaster of claim 1, wherein the calcium sulphate has a particle size such that not more than 25% is rejected when sieved through a 100-micron sieve.

10. The plaster of claim 5 wherein the amount of mineral fillers is between 4 and 6%.

* * * * *

UNITED STATES PATENT OFFICE
CERTIFICATE OF CORRECTION

Patent No. 4,261,757　　　　　　　　　Dated　April 14, 1981

Inventor(s)　Alain Mathieu

It is certified that error appears in the above-identified patent and that said Letters Patent are hereby corrected as shown below:

Column 1, line 56: "restistant" should be --resistant--.

Table I in Cols. 3 & 4 under the column entitled "1000°C", third line down: "1.29" should be --1.39--.

Column 5, line 5: "retardent" should be --retardant--.

Column 6, line 50: "proporties" should be --properties--.

Signed and Sealed this

Twenty-ninth Day of December 1981

[SEAL]

Attest:

GERALD J. MOSSINGHOFF

Attesting Officer　　Commissioner of Patents and Trademarks